Dec. 20, 1938.   F. STONER   2,140,564
MOTOR CONTROL
Filed March 16, 1937
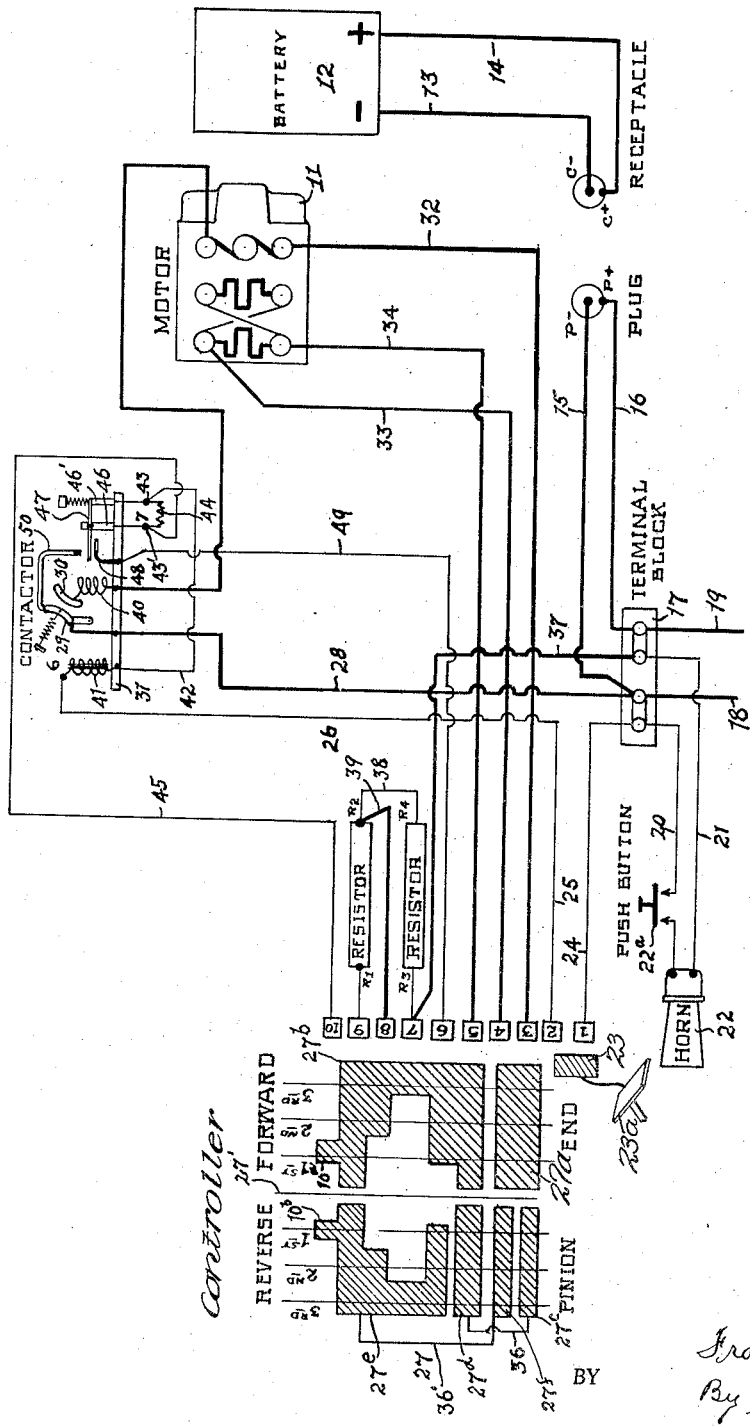
INVENTOR.
Frank Stoner
BY Geo. B. Pitts
ATTORNEY.

Patented Dec. 20, 1938

2,140,564

UNITED STATES PATENT OFFICE 2,140,564

MOTOR CONTROL

Frank Stoner, Lakewood, Ohio, assignor to The Baker-Raulang Company, Cleveland, Ohio, a corporation of Ohio Application March 16, 1937, Serial No. 131,253

7 Claims. (Cl. 172—179)

This invention relates to controlling means for the circuit of an electric motor, wherein (a) the closing of the motor circuit to drive the motor in either direction at the various speeds that may be provided for, is dependent upon movement of the controller in either direction to and dwell thereof in a predetermined position (such predetermined position being by preference the position of the controller for the first motor speed for driving the motor in either direction) and (b) movement of the controller to a neutral position not only cuts out the supply of the current to the motor but makes the circuit controlling means inoperative; the result being that movement of the controller thereafter in either direction beyond the predetermined position will be ineffective, if operated too quickly or abnormally as hereinafter set forth.

The invention has been applied by me to motor driven vehicles, for example, industrial trucks, but the invention is not limited in its application to vehicles. In such vehicles the operatives often attempt to stop the movement thereof by reversing the current to the motor to operate it reversely, instead of applying the vehicle brake, the effect of which has been to damage the motor, electrical connections therefor and parts of the vehicle. Accordingly, one object of the invention is to so control the current supply to the motor that it will be automatically cut off if or in the event the operative reverses the current supply to the motor, thereby making it necessary to apply the vehicle brake and bring the vehicle to a stop or substantially a stop before the motor may be operated in the reverse direction.

Another object of the invention is to provide an improved controlling means for the circuit of an electric motor wherein the circuit is automatically controlled in the movement of the controller from neutral position in either direction and back to neutral position, whereby (a) while the motor is running in one direction, the supply of current thereto cannot be reversed or (b) the controller abnormally operated.

Another object of the invention is to provide an improved controlling means, including a shunt circuit, for a motor circuit having a contactor provided with a movable contact actuated by an electro-magnet the coil of which is connected in the shunt circuit, whereby the reluctance of the coil is utilized to delay operation of the magnet to prevent closing the motor circuit in the event of abnormal operations of the circuit controller.

Other objects of the invention will be apparent to those skilled in the art to which my invention relates from the following description taken in connection with the accompanying drawing, which shows diagrammatically a controller, an electric motor, a circuit for the electric motor adapted to propel a vehicle and a control means incorporated therewith embodying the invention.

In the drawing, 11 indicates an electric motor. 12 indicates an electrical power supply, preferably consisting of a suitable storage battery having leads 13, 14, which through a suitable receptacle and plug therefor are connected by leads 15, 16, respectively, to bus bars on a terminal block 17. Leads 18, 19, connect the bus bars with any other motor (not shown) with which the vehicle may be equipped. Leads 20, 21, connect the bus bars with a horn 22, which is controlled by a push button 22a.

23 indicates a device, which is operatively connected with the operating pedal 23a for the vehicle brake and so arranged that when the pedal is operated, which operation in industrial trucks releases the brakes (which in these trucks are normally in applied position and engage a wheel fixed to the motor shaft) it connects together contacts 1, 2. The contacts 1, 2, are connected to leads 24, 25, respectively, forming part of a shunt circuit 26 to which reference will later be made. As the brake is held by the operative in released position while the truck is in operation, the contacts 1, 2, remain connected, except when the brake is applied. Due to the fact that the shunt circuit 26 controls the closing and opening of the motor circuit, as will later appear and the brake is normally applied, operation of the controller when the operative is not on the truck, will be ineffective.

27 indicates a controller rotatable on axis 27' in one direction to drive the motor 11, whereby the vehicle is propelled forwardly, and in the opposite or reverse direction to drive the motor in the opposite direction, whereby the vehicle is driven rearwardly, the controller being arranged to provide three speeds in each direction, as indicated in the drawing, but my invention is applicable where a lesser or greater number of speeds may be provided. The controller 27 is connected to a rotatable shaft to one end of which is connected a pinion (shaft and pinion not shown) adapted to be operated in any suitable manner. The controller is provided with portions which are arranged to engage certain of the contacts 3, 4, 5, 6, 7, 8, 9 and 10 when in any position as indicated, as later set forth.

The motor circuit consists of the following: Lead 28 connecting one bus bar through movable and stationary contacts 29, 30, respectively, on contact support 31 to the armature of motor 11, the contact 29 being spring operated and normally held disengaged from the contact 30; lead 32 from motor armature to contact 3; leads 33, 34, connecting field coils of motor 11 to contacts 4, 5, respectively, it being noted that by connecting contacts 3 and 5, in the reverse movement of the controller by lead 36, the motor is reversed; lead 37 connecting the other bus bar to contact 7; lead 38 connecting contacts 7 and 9 and having resistors $R^1$—$R^2$ and $R^3$—$R^4$ connected in series therein; and lead 39 connecting contact 8 to the remote end $R^2$ of resistor $R^1$—$R^2$. 40 indicates a suitable blow-out coil arranged to break the circuit across contacts 29, 30, in a well known manner.

The shunt circuit 26, which controls closing and opening of the motor circuit in the operation of the controller 27, consists of the following: Leads 24, 25 (already referred to) connected to one end of coil 41 of an electro-magnet, which operates the movable contact 29 into engagement with the contact 30 when the coil of the magnet is energized; lead 42 connecting the other end of the coil 41 to one end 43 of a resistance 44; lead 45 connecting the other end 43' of resistance 44 to contact 10, which is engaged by a projecting contact 10a or 10b on the controller 27 when the latter is rotated to first speed position in one direction or the other direction, and disengaged therefrom when the controller is moved in either direction to second or third speed position; terminals 46, 46', mounted on the support 31 and electrically connected to the opposite ends of resistance 43, a spring operated contact device 47 fulcrumed on terminal 46 and normally in electrical contact with terminal 46', and arranged to disengage terminal 46' and engage a stationary contact 48; and a lead 49 connecting contact 48 with contact 6. 50 indicates an operating connection between the movable contact 29 and the contact device 47 and arranged to operate the latter into engagement with contact 48 when said contact 29 is actuated by the electro-magnet into engagement with contact 30 and permit disengagement of said device from the terminal 46' when said contact 29 disengages the stationary contact 30.

With the brake pedal in operated position (that is, brake released) and contacts 1, 2, connected, operation of the controller will effect engagement with the contacts 3 to 10, inclusive in the following manner: In the forward direction, contacts 3, 4, will be connected by controller portion 27a when the controller is moved to first, second and third speed positions. At the first speed position, contacts 3, 4, 5, 9 will be engaged by controller portions 27a, 27b, and thereafter contacts 6 and 10 will be engaged by controller portion 27b and projecting contact 10a, thereby (a) closing the shunt circuit 26 through leads 45, 24 and 25, and operating the movable contact 29 into engagement with the stationary contact 30 to close the motor circuit through resistors $R^1$—$R^2$ and $R^3$—$R^4$, and (b) moving contacting device 47 into engagement with the contact 48 to complete the shunt circuit through lead 49, provided the controller is held or dwells in this position long enough for the flux to build up in the coil 41 and operate the movable contact. With the shunt circuit closed through lead 49, the motor circuit will remain closed through contacts 29, 30 and permit the controller to drive the motor at the second and third speeds. In operation of the controller 27 to neutral position, contacts 6 and 10 are disengaged thereby breaking the shunt circuit 26, the effect of which is to de-energize the coil 41 and open the motor circuit across contacts 29, 30, and thereafter contacts 3, 4, 5 and 9 are disengaged to open the motor circuit. If the controller is moved to the second and/or third speed positions, without a dwell at the first speed position, the coil 41 will be ineffective to actuate the movable contact 29 and accordingly the motor circuit will remain open. Accordingly, it will be seen that if the motor 11 is being driven in one direction, operation of the controller to the reverse position will be ineffective to close the circuit, for reasons later set forth.

The operating connection 50 between the movable contact 29 and the contact device 47 to operate the latter into contact with terminal 46 is provided to insure supply of current to the motor 11, when the controller 27 is operated to second and third speed positions, provided a "dwell" has been effected at the first speed position, so that the circuit through coil 41 is established and maintained closed through lead 49 upon movement of the controller to second and third speed positions.

At the second speed position, contacts 5, 6, 8 and 9 will be engaged by controller portion 27b, thereby shorting out resistor $R^1$—$R^2$. At the third speed position, contacts 5, 6, 7, 8 and 9 will be engaged by the controller portion 27b, thereby shorting out resistor $R^2$—$R^3$, as well as resistor $R^1$—$R^2$.

In operating the controller 27 in the opposite or rearward direction from neutral position, contacts 1, 2, will be connected as already set forth and contacts 3, 5, by controller portions 27c, 27d, through lead 36, to operate the motor 11 in the corresponding direction. At the first speed position, contacts 4, 6, 9 and 10 will be engaged by controller portions 27f, 27e and projecting contact 10b (controller portions 27f and 27e being connected by lead 36'). At the second speed position, contacts 4, 6, 8 and 9 will be engaged by the controller portions 27f, 27e, thereby shorting out resistor $R^1$—$R^2$. At the third speed position, contacts 4, 6, 7, 8 and 9 will be engaged by the controller portions 27f, 27e thereby shorting out resistor $R^2$—$R^3$, as well as resistor $R^1$—$R^2$.

In operating the controller in the rearward direction, the shunt circuit 26 is controlled through contacts 10 and 6 in the same manner as in operating the controller in the forward direction, so that it will not be necessary to repeat the description thereof.

The coil 41 of the electro-magnet is balanced with respect to the power supply and resistance value of the resistors $R^1$—$R^2$, $R^3$—$R^4$, and the motor, so that if the latter is running and the current supply thereto is reversed, the voltage drop will allow the movable contact 29 to disengage contact 30 and thus open the motor circuit. Due to the fact that upon opening of the motor circuit the voltage immediately builds up, the movable contact 29 will engage the contact 30 following which, on account of the drop in the voltage, the movable contact 29 will immediately disengage the contact 30, and this engagement and disengagement will continue unless or until the operative applies the vehicle brake and brings the vehicle to a stop or returns the controller to neutral position.

By reason of the fact that the controller must be held in the first speed position until the movable contact 29 is actuated and contact device 47 engages terminal 46, it becomes impossible to drive the motor in the event the controller is operated to the second and/or third speed position without the dwell at the first speed position; and since, with the motor running in one direction, operation of the controller to reverse the current to the motor will be ineffective to supply current thereto, the operative is compelled to apply the vehicle brake to stop the motor whether the vehicle is to be brought to a stop or its direction of movement is to be reversed. The resistance 44 is removable and is employed so that it may be changed where the power supply is increased or decreased to insure a balanced relation between the coil 41 of the electro-magnet and the voltage in the motor circuit.

To those skilled in the art to which my invention relates, many changes in construction and widely differing embodiments and applications of the invention will be apparent without departing from its spirit and scope. My disclosures and the description herein are purely illustrative and not intended to be in any sense limiting.

What I claim is:

1. In control means for a motor circuit, the combination with a motor, a controller and a source of power supply for the motor, of a circuit for the motor including stationary and movable contacts, and contacts from said source arranged to be engaged by portions of said controller when moved to predetermined different speed positions, and electrical means, actuated independently of the controller for closing the motor circuit through said movable contact when the controller moves from neutral position to and dwell thereof in a predetermined position.

2. A control means as claimed in claim 1 wherein the actuating means closes the movable contact upon the movement of the controller to the first speed position.

3. In control means for a motor circuit, the combination with a motor, a controller and a source of power supply, of an electric circuit for the motor including a stationary contact and a movable contact arranged to engage therewith, and contacts arranged to be engaged by portions of said controller to drive said motor at different speeds, and electrical means for actuating said movable contact, the circuit for said means being completed through said controller and said means being operable upon the dwell of said controller in the lower speed position and inoperable when the controller is moved direct to the higher speed position.

4. In control means for a motor circuit, the combination of a reversible motor, a controller movable from neutral position in opposite directions and a source of current supply, of an electric circuit for the motor through the controller and including a stationary contact, a movable contact normally disengaged therefrom and contacts arranged to be engaged by portions of said controller to effect low speed and higher speed when moved from neutral position in either direction, and independently operated electrical means for closing the motor circuit by actuating said movable contact into engagement with said stationary contact when the controller is moved in either direction and arranged to disengage the movable contact from said stationary contact when said controller is moved to neutral position, the operation of said means being dependent upon the dwell of said controller in one of said positions for operating the motor in either direction.

5. In control means for a motor circuit, the combination with a motor, a controller and a source of power supply for the motor, of a circuit for the motor including a stationary contact and a movable contact arranged to engage therewith and separate contacts arranged to be engaged by portions of said controller when moved to predetermined different speed positions, a shunt circuit connected by leads to certain of said separate contacts and arranged to be closed when the controller is moved to the first speed position and opened through one of said separate contacts upon movement of the controller to another speed position, an electro-magnet, the coil of which is connected in said shunt circuit, for operating said movable contact, switch contacts connected to one side of said shunt circuit and another one of said separate contacts, respectively, the movable one of said switch contacts being operatively connected to said movable contact, to engage and maintain the shunt circuit closed upon movement of the controller to another speed position.

6. In control means for a motor circuit, the combination of a motor, a controller and a source of power supply, of a circuit for the motor including said controller a stationary contact and a movable contact, separate contacts arranged to be engaged by portions of said controller and a resistor, means for moving said movable contact into engagement with said stationary contact upon movement of said controller to its first speed position and maintaining it engaged therewith in the movement of the controller to another speed position, said means including a shunt circuit connected to certain of said separate contacts and including an electro-magnet for actuating said movable contact, the coil of said electro-magnet being balanced with respect to the power supply and the resistance value of said resistor and motor, and effective upon drop of voltage in said motor circuit, to permit disengagement of said movable contact from said stationary contact.

7. In control means for a motor circuit as claimed in claim 6 wherein the said contact moving means requires a dwell of said controller in the first speed position to effect movement of said movable contact into engagement with said stationary contact.

FRANK STONER.